United States Patent
Alcantar et al.

(10) Patent No.: US 6,548,992 B1
(45) Date of Patent: Apr. 15, 2003

(54) INTEGRATED POWER SUPPLY PROTECTION CIRCUIT

(75) Inventors: Raul Alcantar, Plano, TX (US); Carl Milton Wildrick, Parker, TX (US)

(73) Assignee: Innoveta Technologies, Inc., Plano, TX (US)

( * ) Notice: Subject to any disclaimer, the term of this patent is extended or adjusted under 35 U.S.C. 154(b) by 0 days.

(21) Appl. No.: 10/007,497

(22) Filed: Oct. 18, 2001

(51) Int. Cl.[7] ............................. G05F 1/40; H02M 1/12
(52) U.S. Cl. ............................. 323/285; 363/49
(58) Field of Search ..................... 323/285, 283, 323/282, 284, 903, 280, 281, 277; 363/98, 132, 97, 49, 56, 41, 50

(56) References Cited

U.S. PATENT DOCUMENTS

| | | | |
|---|---|---|---|
| 4,335,414 A | * | 6/1982 | Weber ......................... 361/100 |
| 4,872,100 A | * | 10/1989 | Diaz ............................. 363/41 |
| 5,926,383 A | | 7/1999 | Pilukaitis et al. |
| 5,986,902 A | * | 11/1999 | Brkovic et al. ................. 363/50 |
| 6,028,755 A | * | 2/2000 | Saeki et al. .................. 361/91.1 |
| 6,269,011 B1 | * | 7/2001 | Ohshima ....................... 363/50 |
| 6,333,623 B1 | * | 12/2001 | Heisley et al. ............... 323/380 |

OTHER PUBLICATIONS

Rudolf P. Stevens, Gordon (ED) Bloom; Modern DC—To—DC Switchmode power Converter Circuits, Van Nostrand Reinhold Electrical/Computer Science and Egnineering Series, ©1985; pp. 13–29, Van Nostrand Reinhold Company, New York. No Date.
CS51021A, CS51022A, CS51024A, CS51023 A Enhanced Current M ode PWM Controller; Semiconductor Components Industries, LLC, 2000, Nov. 2000—Rev 4.

* cited by examiner

Primary Examiner—Rajnikant B. Patel
(74) Attorney, Agent, or Firm—David W. Carstens; Carstens Yee & Cahoon. LLP

(57) ABSTRACT

A power supply with a protection circuit that protects against over current, short circuit, output overvoltage, and input undervoltage with a minimal number of components. A pulse width modulated power supply has a controller using two operational amplifiers, namely an error amplifier and an overvoltage comparator, which are used to limit the duty cycle of the power supply. When the output voltage differs significantly from a reference, the overvoltage comparator triggers causing the supply to enter hiccup mode wherein it shuts off and automatically restarts, checking to see if the condition which caused shutdown is still present.

12 Claims, 3 Drawing Sheets

INTEGRATED POWER SUPPLY PROTECTION CIRCUIT

BACKGROUND OF THE INVENTION

1. Technical Field

The present invention is directed to power supplies, and more particularly, to protection circuits for use with a controller.

2. Description of the Related Art

In power supply design, a critical feature for many end users is the ability of a power module to self-protect both itself and the circuitry it powers during fault or trouble conditions. There are several common trouble modes that must be accounted for in the design of a power module. These include output overload protection, short circuit protection, output overvoltage protection, and input undervoltage protection.

Output overload protection is required to protect the end user against excessive current and heating in either the power supply module or the end user's circuitry due to either a misapplication or a damaged device. Output short circuit protection is required to protect the end user from excessive current and heating in either the power supply or the end user's circuitry due to a failed device. Output overvoltage protection is required to protect the end user's circuitry from being powered by excessively high voltage. This failure mode is due to either a failure in the power module's control loop or a misapplication by the end user, e.g., adjusting an adjustable output voltage higher than the supply is rated for. Input undervoltage protection protects the end user against excessive input current and heating in either the power module or the end user's circuitry due to the power module running at an input voltage that is lower than the supply is rated for.

It is a goal of the power supply designer to implement the required protection circuits in a manner that is both cost effective and space efficient. Various previous methods have attempted to address circuit protection in power supplies. In many designs, the power module continues to run using a different control mechanism, in others it enters a hiccup mode of operation, while in others the module shuts off until power is cycled. Regardless of the method of protection used, the protection circuits are implemented independently resulting in higher component count and cost, as well as higher space requirements.

A typical prior art protection circuit is shown in FIG. 4. This diagram depicts an undervoltage lockout circuit. The circuit consists of a first resistor 410 coupled to a second resistor 420 that is in turn coupled in parallel with a capacitor 430. The capacitor 430 is coupled to a first and second input of a universal voltage monitor (UVM) 440, which monitors undervoltage conditions. A third resistor 450 is coupled between the first resistor 410 and the output of the UVM 440. A fourth resistor 460 is coupled to a third input of the UVM 440 and a fifth resistor 470 is coupled between the fourth resistor 460 and the output of the UVM 440. Finally, the output of the UVM 440 is coupled to a power supply 480. An input voltage Vin is sensed and then compared to a reference voltage. The output of the UVM 440 will be zero when the input voltage is lower than a reference voltage. Once the output of the UVM 440 drops to zero, the power supply 480 will be disabled. Once the input voltage rises above the reference voltage, the power supply 480 will be reactivated. As can be seen, a significant number of components are used to implement this protection circuit.

It is desirable to merge protection features to achieve low component count and low cost. Some art exists which combines an undervoltage and over current protection circuit. Despite this combination, the component count is still high, though lower than if the circuits were independently implemented. This type of solution often latches the power module off and therefore requires power, cycling before restarting. For many users, the power cycling, requirement is undesirable. There is therefore needed in the art a new, lower component count and low cost power supply protection circuit.

SUMMARY OF THE INVENTION

The circuit demonstrating the present innovations is used to implement protection features with a minimal number of components. In a preferred embodiment, the innovative power module provides overcurrent (or overload), short circuit, output overvoltage, and input undervoltage protection. In a preferred embodiment, the protection circuit uses a hiccup mechanism where the module shuts off briefly and then attempts to auto-restart.

In a preferred embodiment, an operational amplifier compares a reference voltage to a voltage which is proportional to the, output voltage of the power supply. Under certain failure conditions, this produces an error signal which is compared to a second reference signal. Depending on the second comparison, a duty cycle exceeding a maximum or saturation of the control loop will cause the power supply to enter a hiccup mode wherein it repeatedly shuts itself down briefly then restarts to see if the. failure condition is gone.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
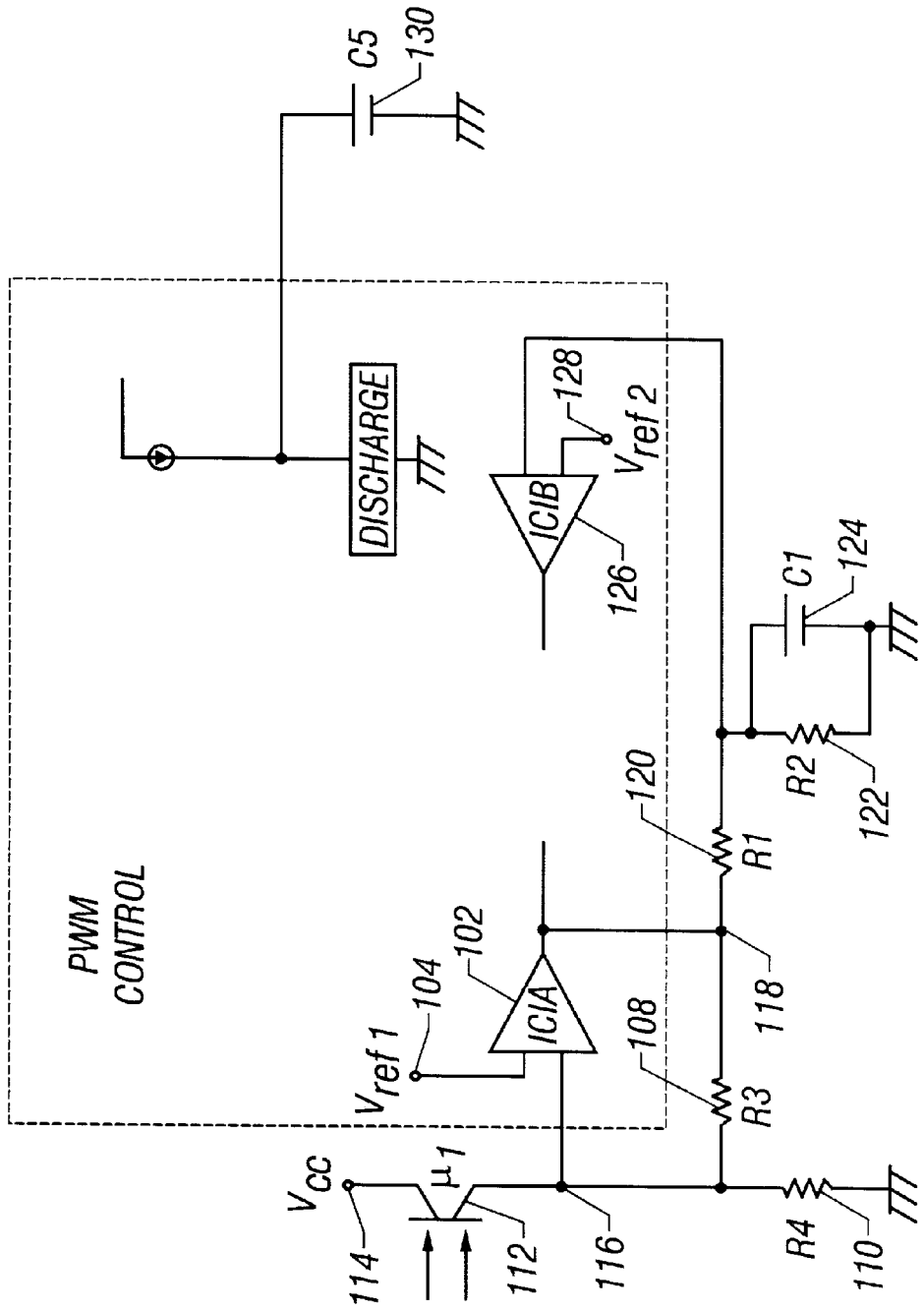
FIG. 1 is a schematic showing the combination of a control integrated circuit and other circuit components in accordance with the present invention.

The present innovations will be described with respect to the figures. FIG. 1 shows a circuit used to implement the protection features of the preferred embodiment with a minimal number of components. The figure does not show all components of the controller, only those necessary for the practice of the current innovations. The control chip used in this description has two comparators, or op amps, each of which is capable of comparing a reference voltage to another input. The requirements of the control chip are discussed first, followed by the additional circuitry required for implementing the current innovations.

The operational amplifier, IC1A 102 is a component that is present internally to the majority of standard PWM controllers. It is typically used as an error amplifier to control the power supply and regulate the output voltage to the desired level. In the presently disclosed innovative system, this op amp serves as an "error amplifier" in that it measures the voltage difference between its two inputs, which include one 2.5V reference voltage and a voltage which is proportional to the output voltage of the power supply itself, as discussed further below.

Operational amplifier IC1B 126, also called the overvoltage (OV) comparator, is present internally in some PWM controllers. The OV comparator is traditionally used to sense over input voltage and turn off the PWM controller. In the presently disclosed innovative system, when the OV comparator is tripped, the PWM controller is disabled and the switching power supply stops switching.

When the comparator 126 is tripped, the soft start capacitor C5 130 is discharged. The switching resumes after soft-start capacitor C5 130 is discharged below a threshold determined by the controller IC, itself. The capacitor C5 130 is referred to as a "soft start" capacitor because it allows increase of the duty cycle slowly, as the capacitor itself charges. In the preferred embodiment, this capacitor is attached to the soft start pin of the control chip.

When the threshold is reached and switching resumes, the soft start capacitor C5 130 charges again. If, after this autostart, the module is still experiencing a failure mode, then the overvoltage comparator 126 will again be tripped, discharging the soft start capacitor C5 130. The module will continue to auto-start in such a hiccup mode until the trouble condition is no longer present and the overvoltage comparator 126 is no longer tripped.

Though in this description the two operational amplifiers are shown as integrated into the control chip, it is possible to instead use a control chip that does not have these exact components. For example, the error op ampor even the overvoltage shut down comparator may not be an integrated part of the control IC. In such an event, the missing components must be added as extra circuitry outside the control chip. Though such an implementation is possible, it is less preferred and requires more external components than a control chip with the comparators, etc., integrated therein.

Figure 3:
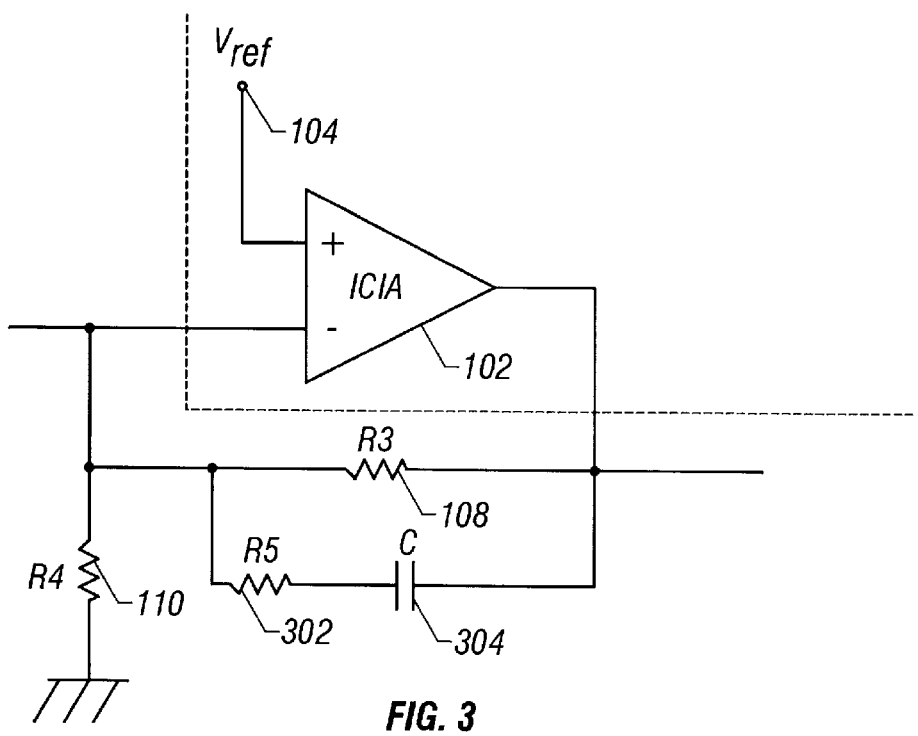
FIG. 3 shows an alternate embodiment of a section of the innovative protection circuit.
Figure 4:
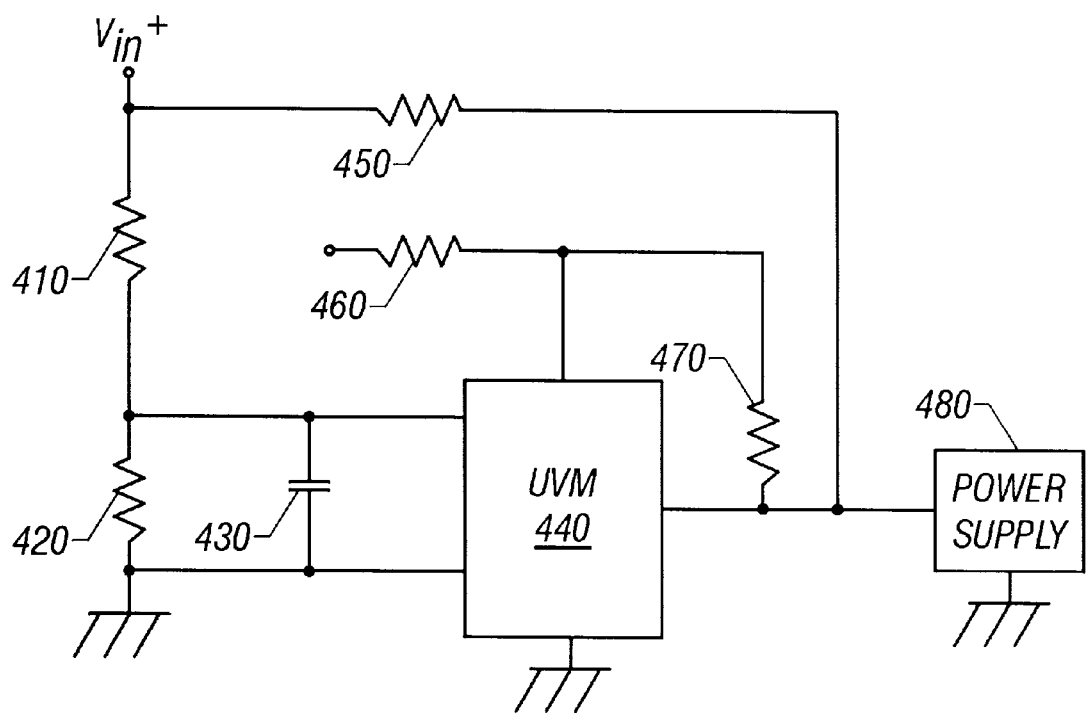
FIG. 4 shows a prior art protection circuit.

In the preferred embodiment, as shown in FIG. 1, the dashed line delineates between components which are part of the IC controller chip and those which are added individually to the power supply protection circuit. The operational amplifier IC1A 102 serves as an error amplifier and measures the difference between the reference voltage 104 (preferably 2–2.5 volts, depending on the control chip used) and the input from a voltage which is proportional to the output voltage of the power source 106. As depicted, the reference voltage is internally available to op amp 102 while the other input is connected to a pin on the control chip which inputs to op amp 102. Other external components, resistors R3 108 and R4 110 and opto-coupler U1 112 are present for the purpose of regulating the output voltage of the power module. Although R3 and R4 are shown, other combinations of resistors and capacitors may be present around the error amplifier for the purpose of compensating the control loop. (An example of such alternate components is shown in FIG. 3, below.) Opto-coupler 112 is connected between the input voltage Vcc 114 (or another DC voltage) and node 116 which serves as input for op amp 102. The voltage at node 116 is proportional to the output voltage. In a preferred embodiment, the opto-coupler feeds information about the controlled parameter (preferably the output voltage) across an input-to-output isolation boundary.

Figure 2:
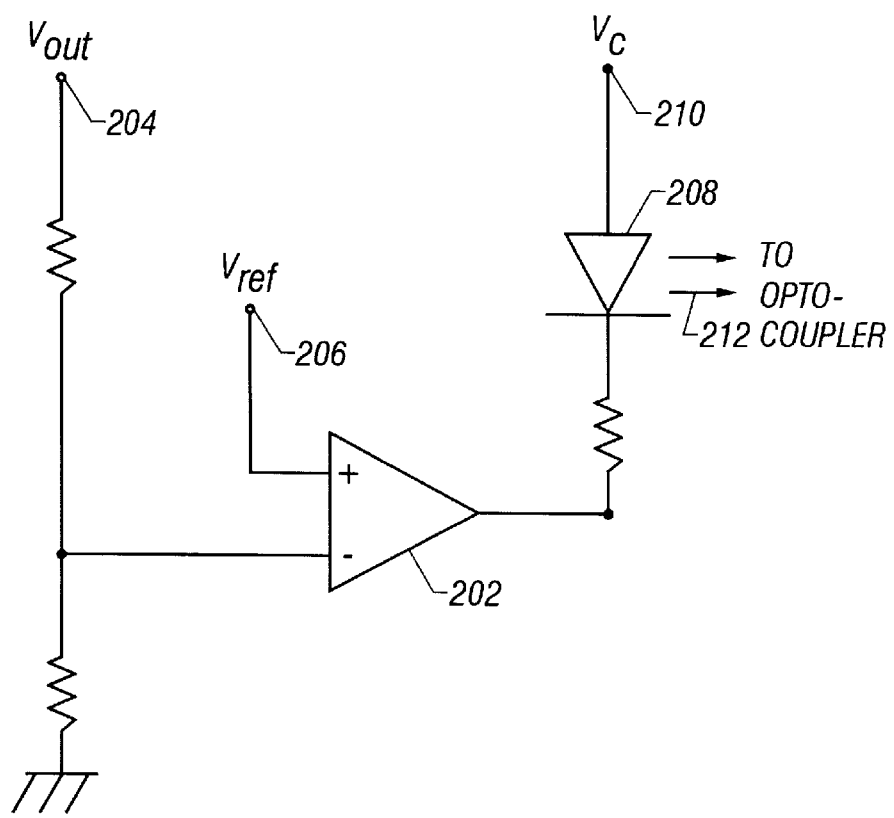
FIG. 2 is a schematic of circuitry for communicating output voltage information to an isolated opto-coupler in accordance with the present invention.

FIG. 2 shows an implementation of a monitoring circuit for the isolated case that communicates to the opto-coupler.

In FIG. 2, an op amp 202 receives input from the output voltage 204 to be monitored and a reference voltage 206, preferably 1.2 volts. The output of the op amp 202 is connected to a light emitting diode 208 (LED), which is connected to the voltage Vc 210. Depending on the current through the LED, an optical signal 212 is transmitted across the isolation boundary to the opto-coupler. It should be noted that the same idea could be implemented using a non-isolated power supply, except that the opto-coupler would not be required. The voltage output in such a case is fed directly to the error amp through a resistor.

Referring once again to FIG. 1, also connected to node 116 are the two resistors 108 and 110. Resistor R4 110 connects to ground while R3 108 connects to node 118. Node 118 is coupled to the output of the op amp IC1A 102 and to resistor R1 120. R1 120 then connects to a circuit comprising a resistor R2 122 and a capacitor C1 124, which both, in parallel, connect to ground.

Resistor R1 120 also connects to an input of operational amplifier or comparator IC1B 126, also called the overvoltage comparator, preferably located on the control chip itself. The second input of op amp 126 is connected to a second reference voltage 128. In a preferred embodiment, the reference voltage 128 is about 1.5 volts, depending on the particular chip which is used.

In the current invention, the output of the error amplifier 102 is sensed by resistor divider R1 120 and R2 122 which converts the output of the error amplifier 102 to a level which can be used by the comparator IC1B 126. Capacitor C1 124 provides filtering to the signal at the input of the op amp 126 to prevent false triggering of the op amp 126. The capacitor C1 124 also provides a delay between output of the error amplifier 102 rising and the overvoltage comparator 126 being tripped. This delay prevents the overvoltage comparator 126 from being tripped immediately during transient conditions.

The output of the error amplifier 102 serves indirectly as an input for comparator 126. As can be seen, the output voltage from error amp 102 will not be exactly the same as the input of comparator 126 because of intervening components, namely resistors. R1 120, R2 122, and capacitor C1 124. The resistor R1 120 causes a voltage drop relative to the output of error amp 102. The resistors R1 120 and R2 122 can therefore be sized to provide a maximum duty cycle limit for the power module. As the output voltage of the power supply changes due to an error condition and moves away from the reference voltage value of 2.5 volts (which is input to the error amplifier 102), the error amplifier outputs greater and greater voltages while the PWM control chip attempts to provide added duty cycle to increase the load, operate with a lower input supply voltage, or increase maximum output voltage as determined by the type of error condition. This increasing voltage input (as decreased by resistors R1 120 and R2 122) to the comparator 126 causes it to trip once it exceeds the reference voltage 128 for comparator 126. Under normal operating conditions, the voltage input to comparator 126 must not be very close to the reference voltage (1.5 volts in a preferred embodiment) or the output signal will saturate high, causing the switching power supply to stop switching, or shut off. The comparator 126 is only triggered if the adjusted error voltage is higher than the reference voltage Vref2 128.

FIG. 3 shows a possible alternative circuit configuration for compensating the control loop. The op amp 102 is as shown in FIG. 1 part of the control chip, the border of which is shown by the dashed line. Op amp 102 has a reference voltage 104 and is connected to R3 108 and R4 110. This figure differs from the previous example by the addition of a resistor 302 and capacitor 304 in parallel with R3 108.

The innovative protection system can be combined with a current limit circuit (not shown) which senses the current in one or more devices to limit the peak and/or average current. When the current reaches a preset level, the current in the device is prevented from increasing further, effectively enforcing a maximum duty cycle on the device. This in turn causes the output voltage of the power module to decrease below the nominal output voltage setpoint of the power module control loop. When the output voltage drops below this nominal output voltage setpoint, the control loop saturates and the error amplifier, op amp 102, output increases as high as it can go. When the output of the error amplifier 102 saturates, the voltage at the overvoltage comparator, comparator 126, increases depending on the values of R1 120, R2 122, and C1 124. When the overvoltage comparator 126 hits the threshold, i.e., the input voltage from the error amplifier overcomes the value of the reference voltage of 1.5 volts, then the power module enters hiccup mode.

The innovative protection circuit offers circuit protection in a variety of conditions with minimal circuit components. In overload and short circuit conditions, the actual output voltage is lower than the nominal output voltage. The output voltage control loop will tend to saturate and the error voltage, or the output of the error amplifier (IC1A), will increase as the voltage control loop attempts to increase duty cycle to raise the power module's output voltage. In the cases of an input undervoltage condition, as the input voltage decreases additional duty cycle is required to maintain the output voltage. As the duty cycle attempts to increase, the error voltage increases. In the case of output overvoltage, as the output voltage increases, additional duty cycle is required, which causes the error voltage to increase. In all the above cases, the error voltage will increase, eventually causing the overvoltage comparator to trip. Thus the innovative system allows protection against the above mentioned failure modes with a minimal addition of circuit components. It should be noted that although the innovative circuit can protect against all the failure modes described herein, in some cases a tighter tolerance protection circuit is required or present for one or more of the features.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

The following references provide additional background and understanding of the current state of the art, and are hereby incorporated by reference: Modern DC-to-DC Switchmode Power Converter Circuits, by Rudolph P. Severns and Gordon Bloom, Van Nostrand Reinhold Company, New York, N.Y. (1985); and Principles of Power Electronics, by John G. Kassakian, Martin F. Schlect and George C. Verghese, Addison-Wesley Publishing Company, Reading, Mass. (1991).

We claim:

1. A pulse width modulated power supply system, comprising:

a controller having an integrated overvoltage detection function connected to sense an output of an error amplifier;

wherein if the output of the error amplifier differs from a reference voltage, the power supply enters a hiccup mode.

2. The power supply system of claim 1, wherein the error amplifier is integrated into the controller.

3. The power supply of claim 1, wherein the output of the overvoltage comparator controls a switch, which, when closed, discharges a soft start capacitor, causing the duty cycle to decrease.

4. A switching power supply protection system, comprising:

a controller having an overvoltage detection function;

wherein, when the switching power supply experiences input undervoltage conditions, output overvoltage conditions, short circuit conditions, or overload conditions, the overvoltage detection function causes the switching power supply to at least temporarily stop switching; and wherein a soft start capacitor discharges, thereby decreasing a duty cycle, responsive to the overvoltage detection function.

5. The switching power supply protection system of claim 4, further comprising an operational amplifier having an output, wherein the overvoltage detection function comprises an overvoltage comparator connected to compare the output of the operational amplifier to a reference voltage such that when the operational amplifier saturates, the overvoltage comparator is triggered.

6. The switching power supply protection system of claim 5, wherein during short conditions or overload conditions, the operational amplifier experiences saturation.

7. A switching power supply circuit having an output, comprising:

a first operational amplifier having a first reference voltage as input and a first voltage as input, the first voltage being proportional to an output of the power supply;

a comparator having a second reference voltage as input and a second voltage as input, the second voltage being proportional to an output of the operational amplifier;

wherein an output of the comparator controls discharge of a soft start capacitor, the soft start capacitor allowing a duty cycle of the power supply to increase or decrease;

wherein when the duty cycle of the power supply increases above a threshold due to an input undervoltage condition or output overvoltage condition, the output of the operational amplifier increases such that the comparator saturates;

wherein when the operational amplifier saturates because of a short circuit condition or an overload condition, the comparator saturates; and wherein when the comparator saturates, the output of the switching power supply at least temporarily stops switching and enters a hiccup mode wherein the switching power supply stops switching briefly, then restarts.

8. The power supply circuit of claim 7, wherein the operational amplifier and comparator are integrated into a controller integrated circuit.

9. The power supply circuit of claim 7, wherein the comparator is an overvoltage comparator.

10. A method of protecting a switching power supply, comprising the steps of:

inputting a first voltage to an operational amplifier, the first voltage being proportional to an output voltage of the power supply;

inputting a first reference voltage to the operational amplifier;

inputting a second voltage to a comparator, the second voltage being proportional to an output of the operational amplifier;

inputting a second reference voltage to the comparator;

wherein when a duty cycle of the power supply increases as a soft start capacitor charges, the duty cycle increasing above a threshold due to an input undervoltage condition or output overvoltage condition, the output of the operational amplifier increases such that the comparator saturates;

wherein when the operational amplifier saturates because of a short circuit condition or an overload condition, the comparator saturates; and wherein when the comparator saturates, the output of the switching power supply at least temporarily stops switching and enters a hiccup mode wherein the power supply shuts down briefly, then restarts.

11. The method of claim 10, wherein the operational amplifier and comparator are integrated into a controller integrated circuit.

12. The method of claim 10, wherein the comparator is an overvoltage comparator.

* * * * *